UNITED STATES PATENT OFFICE.

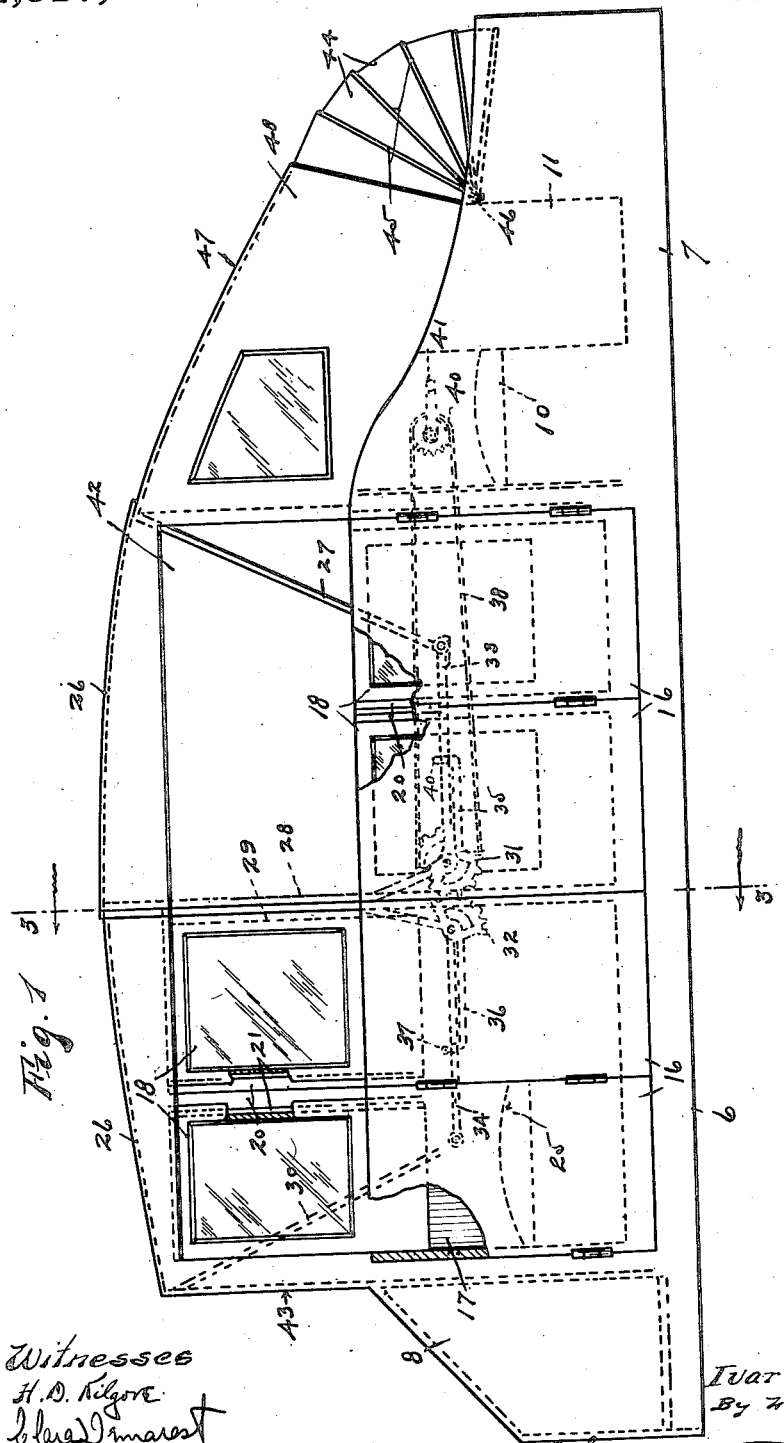

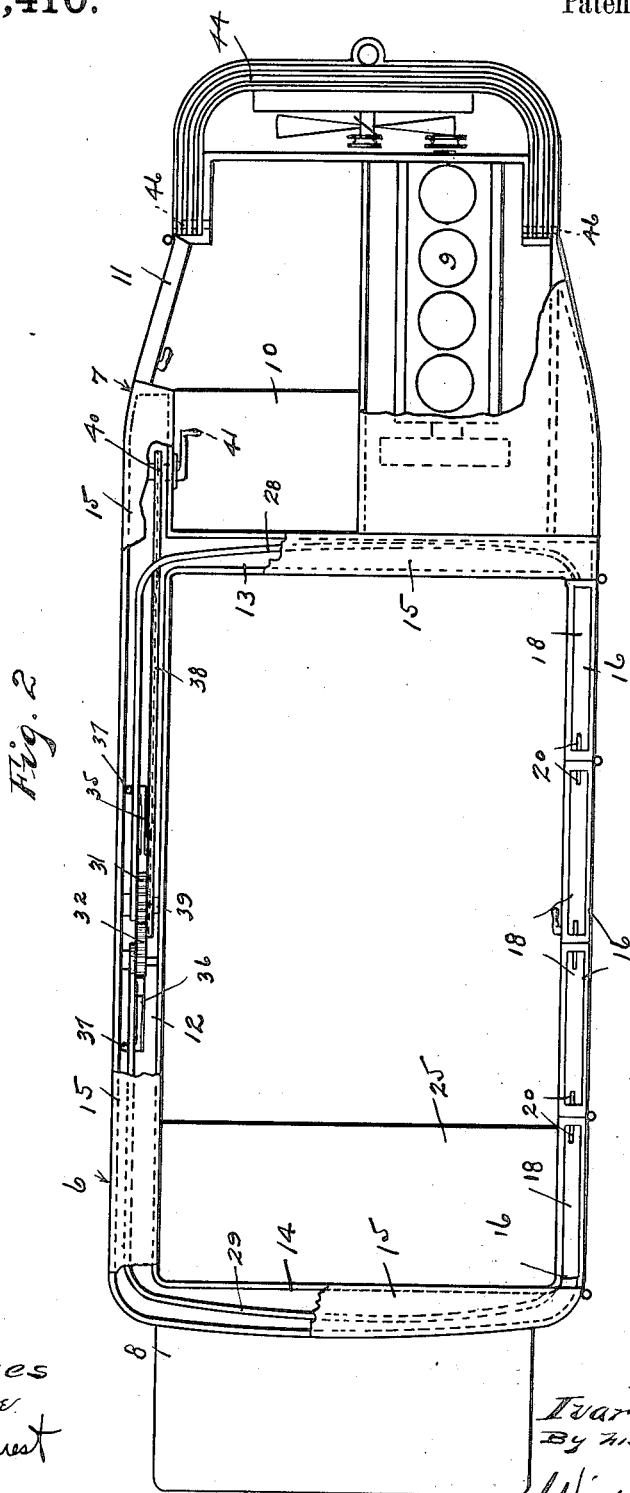

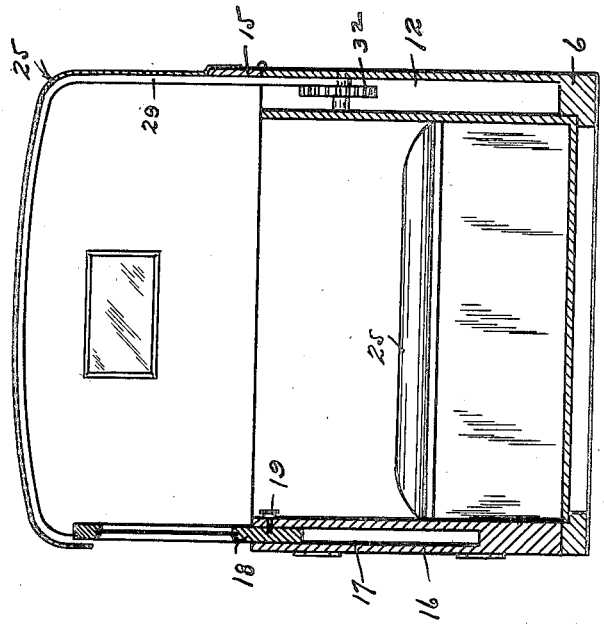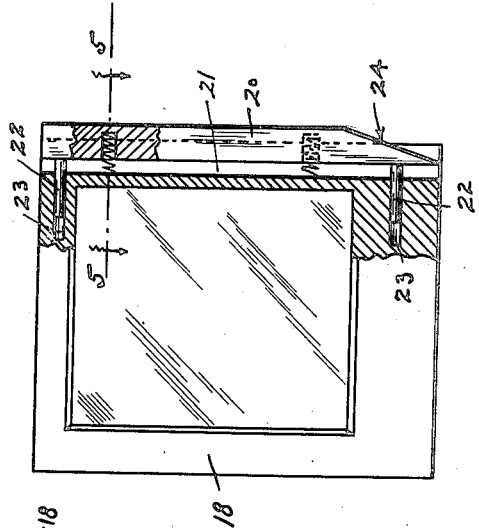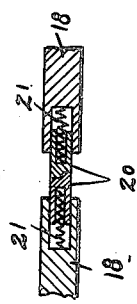

IVAR B. ANDERSON, OF DARWIN, MINNESOTA.

VEHICLE-BODY.

1,317,410.  Specification of Letters Patent.  Patented Sept. 30, 1919.

Original application filed July 5, 1918, Serial No. 243,377. Divided and this application filed September 11, 1918. Serial No 253,622.

*To all whom it may concern:*

Be it known that I, IVAR B. ANDERSON, a subject of the King of Sweden, residing at Darwin, in the county of Meeker and State of Minnesota, have invented certain new and useful Improvements in Vehicle-Bodies; and I do hereby declare the following to be a full, clear, and exact description of the invention, such as will enable others skilled in the art to which it appertains to make and use the same.

My invention relates to improvements in vehicle bodies and is a division of my co-pending application filed July 5, 1918, under Serial Number 243,377, entitled "Vehicle bodies and tops."

To the above end, generally stated, the invention consists of the novel devices and combinations of devices hereinafter described and defined in the claims.

In the accompanying drawings, which illustrate the invention, like characters indicate like parts throughout the several views.

Referring to the drawings,

Figure 1 is a right side elevation of the invention with some parts broken away and some parts sectioned;

Fig. 2 is a plan view of the same with the top down and some parts broken away and some parts sectioned;

Fig. 3 is a view in transverse section taken on the line 3—3 of Fig. 1;

Fig. 4 is a view in side elevation of one of the windows, on an enlarged scale, with some parts broken away and some parts sectioned; and Fig. 5 is a detail view in section taken on the line 5—5 of Fig. 4.

The numeral 6 indicates the main body of a motor-driven vehicle provided with a front extension 7 and a rear extension 8, which affords a storage compartment. The to the front body extension 7 through a for an internal combustion engine 9, which affords the motive power for the vehicle, and a driver seat 10. Access may be had to the front body extension 7 through a door 11 in the lefthand side thereof.

The entire left side of the main body 6 is closed and formed in the wall thereof is a narrow compartment 12, which extends into the front extension 7. Compartments 13 and 14 are formed in the front and rear end walls of the main body 6 and open into the compartment 12. Covers 15 are provided for the compartments 12, 13, and 14. The entire right side of the main body 6 is closed by doors 16. As shown, there are four of these doors 16, the outer two being hinged to the ends of the main body 6 and the other two are hinged to said outer doors. Ordinarily, only one or both of the intermediate doors 16 will be used, but when all four doors are open, the main body 6 will be open from end to end. Suitable latches, not shown will be provided for the doors 16.

In each door 16, is formed, from the top down, a pocket 17 in which is mounted, for vertical sliding movement, a window 18 for use in connection with a top and curtain of novel construction, disclosed and claimed in my heretofore identified case. Locking devices 19 are provided for holding the windows 18 raised. To form tight joints between adjacent windows 18, when raised, joint strips 20 are mounted in channels 21 formed in the stiles thereof. These joint strips 20 are supported for parallel horizontal movement by pins 22 secured thereto and mounted in bores 23 in the end and top rails of the windows 18. Adjacent joint strips 20 have beveled interlocking engagement, when the windows 18 are raised. To separate the coöperating joint strips 20 and permit the windows to be lowered into their pockets 17, the lower ends of said joint strips are beveled to form cams 24, which engage the respective sides of the doors 16 and cam said joint strips into their pockets 17.

While only a single seat 25 is shown in the main body 6, a second seat, of course, will be provided and these seats mounted and operated from a position within the main body to a position at one side thereof, through the open side of the body, as disclosed and broadly claimed in my co-pending application filed July 5, 1918, under Serial Number 243,376, entitled "Vehicle bodies."

The top 26, which is made of fabric or other pliable material, is transversely divided to form front and rear sections. Said front top section is attached to a front bow 27 and an intermediate bow 28 and the said rear top section is attached to an intermediate bow 29 and a rear bow 30. The right-hand legs of the bows are very short and, when the top 26 is raised, are supported from the windows 18. The left-hand legs of all of the bows extend into the compartment 12 and the two left-hand legs of the intermediate bows 28 and 29 are rigidly secured to a pair of intermeshing gears 31 and 32, respectively. These gears 31 and 32 have short shafts journaled in the side walls of the main body 6. A link 33 pivotally connects the left-hand leg of the front bow 27 and the shaft of the gear 31, and a link 34 pivotally connects the corresponding leg of the rear bow 30 to the shaft of the gear 32.

Integrally formed with the gears 31 and 32, are substantially radially projecting arms 35 and 36, respectively, having at their free ends hooks 37 arranged to be carried into and out of engagement with the links 33 and 34. The top sections are simultaneously raised and lowered by a sprocket chain 38, arranged to run over a relatively large sprocket wheel 39 keyed to the shaft of the gear 31, and a relatively small sprocket wheel 40 journaled in the compartment 12 opposite the driver's seat 10. The shaft of the sprocket wheel 40 extends into the front body extension 7 and is provided with a hand crank 41, by which the driver may raise or lower the top sections. When the top sections are lowered, the front section is folded entirely within the compartments 12 and 13 and the rear section is folded entirely within the compartments 12 and 14. In this position of the top sections, the same are entirely out of sight, when the compartments in which they are folded are closed by the covers 15. Also when the top sections are folded, the arms 35 and 36 are out of engagement with the links 33 and 34.

To raise the top sections, the crank 41 is operated and the gears 31 and 32 moved thereby first lift the intermediate bows 28 and 29. This movement of the gears 31 and 32 carries the hooks 37 of the arms 35 and 36 into engagement with the links 33 and 34, and a further movement of said gears will cause the arms 35 and 36 to lift the front bow 27 and the rear bow 30 through the links 33 and 34, respectively. The purpose of causing the arms 35 and 36 to move away from the links 34 and 35 is to permit the intermediate bows to be folded toward the front and rear bows.

When the top sections are raised, suitable means, not shown, will be provided for holding the intermediate bows against folding movement and the front and rear bows are held by the links 33 and 34, which, in turn, are supported by the respective arms 35 and 36. Left-hand side curtains 42 are attached to the top sections for folding movement therewith into the respective compartments and a rear curtain 43 is also attached to the rear top section for folding movement therewith. A wind shield 44 is mounted at the front end of the body extension 7 and comprises a plurality of transparent sections of celluloid or other suitable material secured to a plurality of folding bows 45 having their ends secured to a pair of alined pivots 46 attached to the side of said body extension. As shown in Fig. 2, the wind shield 44 may be folded into the front body extension 7 below the upper edge thereof.

A supplemental top 47, having side curtains 48, attached thereto, is provided for the front body extension 7. This top 47 is attached to the front bow 27 and forms a forward extension of the main top 26. The front end of the supplemental top 47 is detachably secured to the uppermost bow 45 of the wind shield 44 by separable fasteners, not shown, and, in turn, holds said wind shield raised. When the main top 26 is lowered, the supplemental top 47 is detached from the wind shield 44 and folded, together with the curtains 48, with the front section of said main top.

What I claim is:

1. The combination with a vehicle body having one side that is entirely open from the top to the bottom thereof, of a plurality of folding doors for closing the open side of said body, each of said doors having a pocket, and a vertically sliding window mounted in each of said pockets, said windows having mounted in their adjoining stiles coöperating joint strips.

2. The combination with a vehicle body having one side that is entirely open, of a plurality of folding doors for closing the open side of said body, each of said doors having a pocket, and a vertically sliding window mounted in each of said pockets, said windows having mounted in their adjoining stiles spring-pressed joint strips yieldingly engaging one another when the windows are raised.

3. The combination with a vehicle body having one side that is entirely open, of a plurality of folding doors for closing the open side of said body, each of said doors having a pocket, a vertically sliding window mounted in each of said pockets, said windows having mounted in their adjoining stiles spring-pressed joint strips yieldingly engaging one another when the windows are raised, and cams for drawing coöperating pairs of joint strips apart when the windows are lowered.

In testimony whereof I affix my signature in presence of two witnesses.

IVAR B. ANDERSON.

Witnesses:
  CLARA DEMAREST,
  HARRY D. KILGORE.